United States Patent
Hosoda et al.

(10) Patent No.: US 7,151,806 B2
(45) Date of Patent: Dec. 19, 2006

(54) TIME CODE SIGNAL TRANSMITTING METHOD AND TIME CODE SIGNAL TRANSMITTING APPARATUS

(75) Inventors: Takaharu Hosoda, Osaka (JP); Katsuji Uro, Neyagawa (JP); Yukio Shimamura, Hirakata (JP); Masaji Ueno, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 570 days.

(21) Appl. No.: 10/483,776

(22) PCT Filed: Mar. 13, 2003

(86) PCT No.: PCT/JP03/02976

§ 371 (c)(1),
(2), (4) Date: Jan. 14, 2004

(87) PCT Pub. No.: WO03/079682

PCT Pub. Date: Sep. 25, 2003

(65) Prior Publication Data

US 2004/0165111 A1 Aug. 26, 2004

(30) Foreign Application Priority Data

Mar. 19, 2002 (JP) ............................. 2002-076103

(51) Int. Cl.
| H04L 27/04 | (2006.01) |
| H04N 11/02 | (2006.01) |
| G06F 11/10 | (2006.01) |
| H03C 1/52 | (2006.01) |

(52) U.S. Cl. .................. 375/301; 375/240.27; 714/824

(58) Field of Classification Search ................. 714/824
See application file for complete search history.

(56) References Cited

U.S. PATENT DOCUMENTS 5,003,539 A * 3/1991 Takemoto et al. .......... 714/785
6,704,057 B1 * 3/2004 Ueda .......................... 348/460

OTHER PUBLICATIONS

Cutmore et al., Maintaining sound and picture synchronisation in a digital video environment, Sep. 1996, International Broadcasting Convention, IEE, p. 431-437.*

* cited by examiner

Primary Examiner—Shelly Chase
(74) Attorney, Agent, or Firm—McDermott Will & Emery LLP

(57) ABSTRACT

The present invention comprises the step of reading a check-receiving data included in a transmitted time code signal and using the read check-receiving data to generate a transmitting side checking data, and the step of attaching the transmitting side checking data to the transmitted time code signal, as a pre-processing step at the time of transmitting the time code signal. The present invention comprises the step of reading the check-receiving data from the received time code signal and using the read check-receiving data to generate a receiving side checking data, and the step of reading the transmitting side checking data from the received time code signal and comparing the read transmitting side checking data to the receiving side checking data, thereby verifying whether or not an error is generated in the received time code signal. In this way, an error can be detected in the time code signal, as a post-processing step after the time code signal is received.

12 Claims, 4 Drawing Sheets

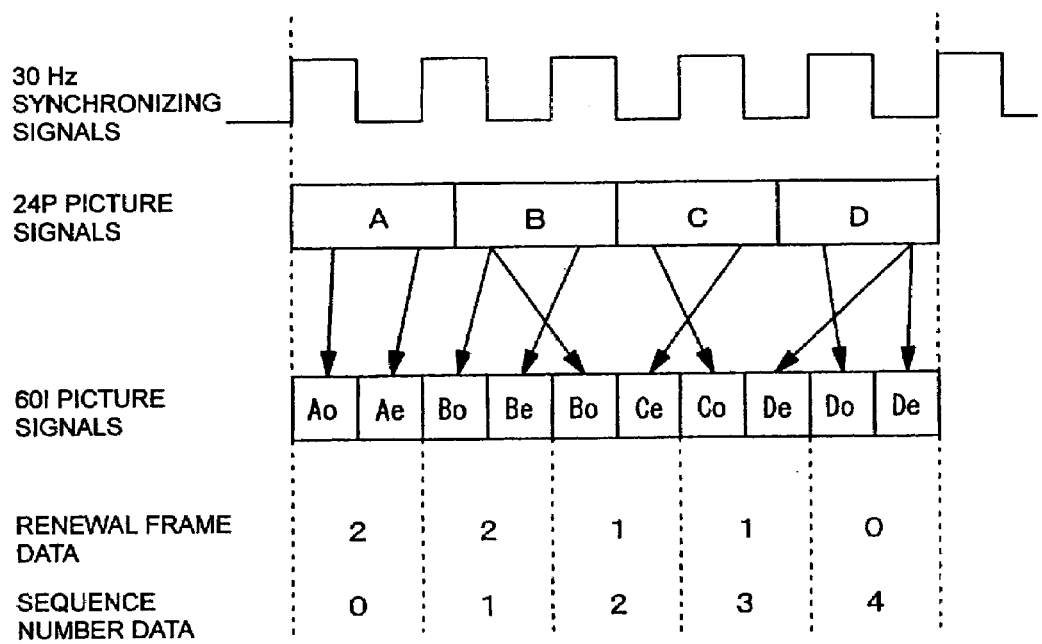
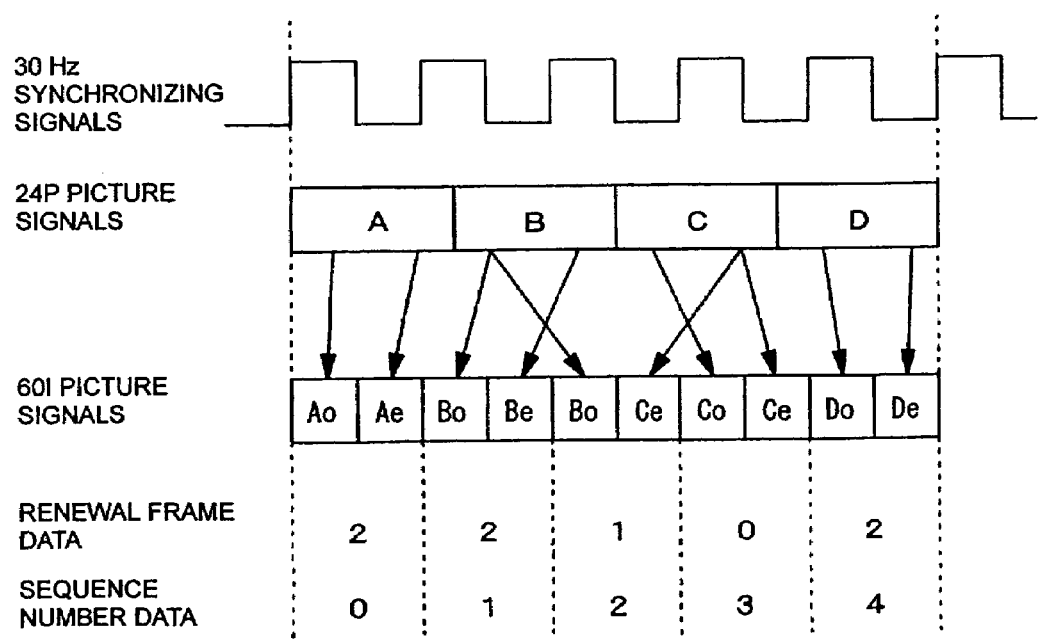

TIME CODE SIGNAL TRANSMITTING METHOD AND TIME CODE SIGNAL TRANSMITTING APPARATUS

TECHNICAL FIELD

The present invention relates to a method and a device for transmitting a time code signal generated to be attached to a picture signal.

BACKGROUND ART

As a time code signal used in the transmission of a picture signal, there is an LTC (linear time code) signal, which is recorded on a voice frequency band after being subjected to bi-phase mark modulation. Time code signals are transmitted in synchronization with picture signals.

In a time code signal, an error (change in data content) may be generated by a reading failure or transmission failure when the time code signal is regenerated from a regenerating device or the signal is transmitted. Such an error causes a deterioration in the precision of the time code signal. For this reason, it is necessary to detect the generation of the error in the time code signal with high accuracy. When the error can be detected, the use of the time code signal can be stopped. The location of the error can also be restored by applying a given processing to the time code signal.

Hitherto, however, the method or structure for detecting an error generated in time code signals has not been carried out at all, and effective proposals have not yet been made.

Accordingly, a main object of the present invention is to provide a method and a device for transmitting a time code signal which can detect an error generated during the transmission of the time code signal effectively.

DISCLOSURE OF THE INVENTION

The time code signal transmitting method of the present invention comprises the step of reading a check-receiving data included in a transmitted time code signal and using the read check-receiving data to generate a transmitting side checking data; and the step of attaching the transmitting side checking data to the transmitted time code signal as a pre-processing step at the time of transmitting the time code signal. Furthermore, The time code signal transmitting method of the present invention comprises the step of reading the check-receiving data from the received time code signal and using the read check-receiving data to generate a receiving side checking data; and the step of reading the transmitting side checking data from the received time code signal and comparing the read transmitting side checking data to the receiving side checking data, thereby verifying whether or not an error is generated in the received time code signal as a post-processing step after the time code signal is received.

The time code signal transmitting device of the present invention comprises a transmitting device for transmitting a time code signal, and a receiving device for receiving the time code signal transmitted by the transmitting device. The transmitting device comprises a transmitting side checking data generator for reading a check-receiving data included in the transmitted time code signal and using the read check-receiving data to generate a transmitting side checking data; and an attaching unit for attaching the transmitting side checking data to the transmitted time code signal. The receiving device comprises a receiving side checking data generator for reading the check-receiving data from the received time code signal and using the read check-receiving data to generate a receiving side checking data, and a verifying unit for reading the transmitting side checking data from the received time code signal and comparing the read transmitting side checking data to the receiving side checking data, thereby verifying whether or not an error is generated in the received time code signal.

When the time code signal transmitting method or transmitting device is constructed in this way, an error generated on the time code signal at the time of regeneration, transmission or the like can be verified with high precision by comparing the receiving side checking data generated from the received time code signal to the transmitting side checking data read from the received time code signal.

Preferably, the present invention can be applied to a time code signal transmitting method or transmitting device for transmitting a single time code signal. Furthermore, the single time code signal is preferably an LTC signal. In this way, the present invention can be carried out in a system for transmitting a single time code signal. Therefore, an error can be verified without complicating a time code signal transmitting system.

It is preferable to use, as the check-receiving data, a data recorded on a user's bit area for the time code signal and to further attach the checking data to the user's bit area for the time code signal. In this way, an error can be verified in the user's bit area for the time code signal.

According to the present invention, an error of a time code signal (user's bit area) can be specified and detected in frames which constitutes picture signals. In a method and a device for transmitting a time code signal corresponding to a picture signal to which format conversion in which a change in the number of frames of picture signals per second is generated is applied, it is necessary that the position, on the signals, of the picture signal after the format conversion is specified in frames. Therefore, the present invention, which can detect an error in frames, is particularly effective for the case that such format conversion is performed.

BRIEF DESCRIPTION OF THE DRAWINGS

FIGS. 2A and 2B are schematic views illustrating format conversions when 24P picture signals are format-converted to 60I picture signals.

BEST MODE FOR CARRYING OUT THE INVENTION

Figure 1:
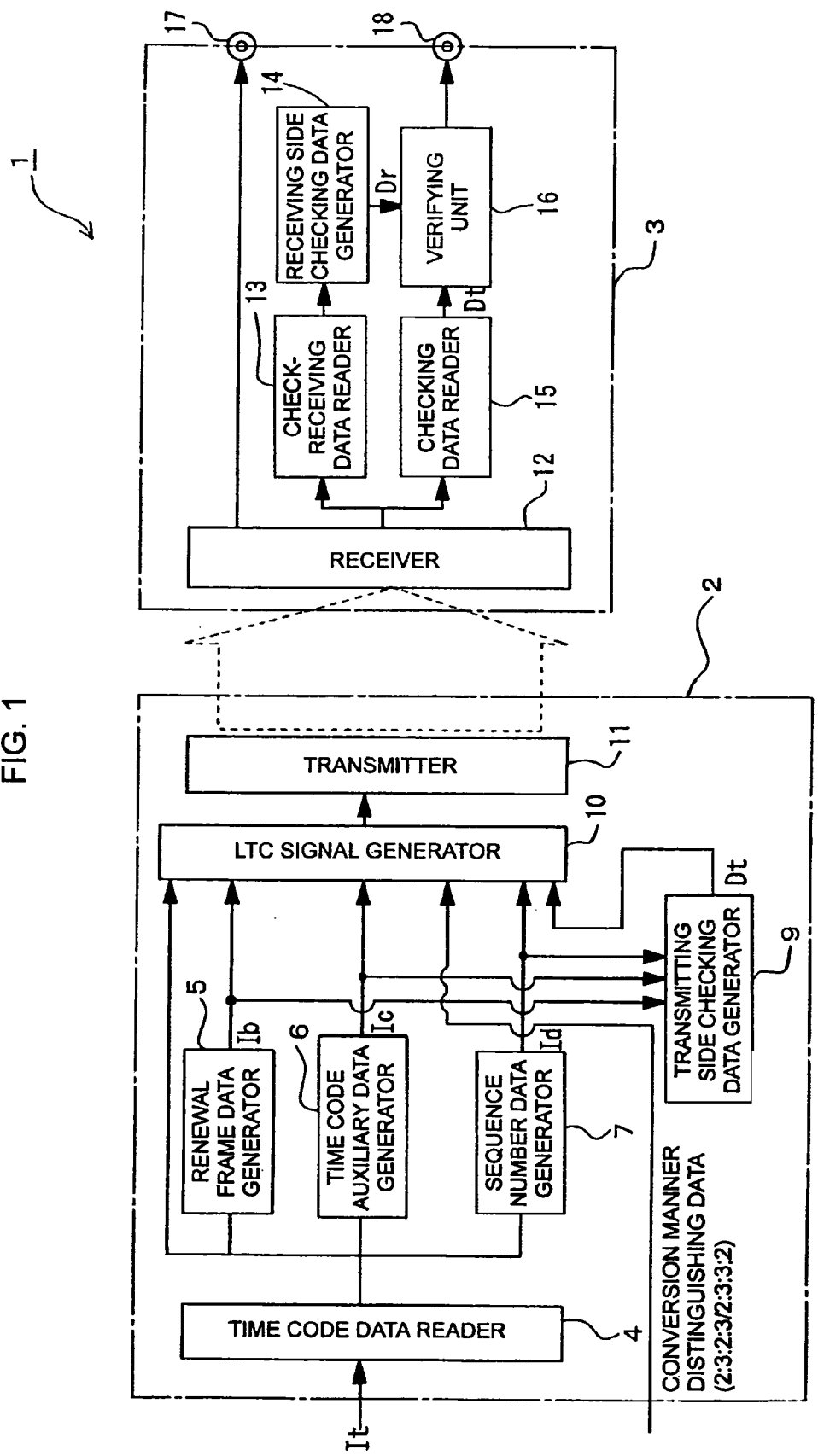
FIG. 1 is a block diagram for illustrating the structure of a time code signal transmitting device of a preferred embodiment of the present invention.

Referring to the drawings, the preferred embodiment of the present invention is described in detail hereinafter. FIG. 1 is a block diagram illustrating the structure of a time code signal transmitting device of the preferred embodiment of the present invention. In the present embodiment, it is assumed that format conversion is carried out. In the present embodiment, the present invention is carried out in the device for transmitting time code signals corresponding to picture signals after the format conversion. More specifically, in the present embodiment, it is assumed that a picture signal in a progressive format of 24 frames/second (hereinafter referred to as a 24P format) (hereinafter referred to as a 24P picture signal) is primarily converted to a picture signal in an interlace format of 30 frames/second (hereinafter referred to as a 60I format) (hereinafter referred to as a 60I picture signal).

In the present embodiment, the present invention is carried out in a time code signal transmitting device 1 for transmitting a time code signal corresponding to a picture signal after the format primary conversion (60I picture signal) when such a conversion is carried out, or in a secondary conversion (reverse conversion) of the format using the transmitted time code.

The time code signal transmitting device 1 has a transmitting device 2 and a receiving device 3. First, the structure of the transmitting device 2 is described.

The transmitting device 2 has a time code data reader 4, a renewal frame data generator 5, a time code auxiliary data generator 6, a sequence number data generator 7, a transmitting side checking data generator 9, an LTC signal generator 10, and a transmitter 11.

The time code data reader 4 reads a time code data "It" generated outside the time code signal transmitting device 1. The time code data reader 4 outputs the read time code data "It" to the renewal frame data generator 5, the time code auxiliary data generator 6, the sequence number data generator 7, and the LTC signal generator 10.

The renewal frame data generator 5, the time code auxiliary data generator 6, and the sequence number data generator 7 generate various attachment data Ia from the time code data "It" which the time code data reader 4 reads. The attachment data Ia are data stored in a user's bit area 20 for LTC signals (time code signals).

The attachment data Ia include a renewal frame data Ib, a time code auxiliary dat Ic, and a sequence number data Id. The renewal frame data Ib is generated in the renewal frame data generator 5. The time code auxiliary data Ic, is a data including a frame rate data (the numerical data of a frame rate) $Ic_1$, a data $Ic_2$ for distinguishing interlace/progressive formats from each other, and other auxiliary data $Ic_3$. The time code auxiliary data Ic, having such a construction is generated in the time code auxiliary data generator 6. The sequence number data Id is generated in the sequence number data generator 7.

The generators 5, 6 and 7 outputs the generated various attachment data Ia, to the LTC signal generator 10 and the transmitting side checking data generator 9.

The transmitting side checking data generator 9 generates a transmitting side checking data Dt, from the inputted attachment data Ia (the renewal frame data Ib, the time code auxiliary data Ic, and the sequence number data Id), and then outputs the data DT to the LTC signal generator 10. That is, the transmitting side checking data generator 9 converts the inputted attachment data Ia into check-receiving data, so as to generate the transmitting side checking data Dt.

The LTC signal generator 10 generates an LTC signal data, which is a time code signal, on the basis of the time code signal It, the attachment data Ia (the renewal frame data Ib, the time code auxiliary data Ic, and the sequence number data Id), and the transmitting side checking data Dt. The LTC signal generator 10 outputs the generated LTC signal to the transmitter 11. The transmitter 11 transmits the inputted LTC signal to the receiving device 3. The method of the transmission is not particularly limited. The transmitter 11 transmits the LTC signal to the receiving device 3, for example, through cable transmission.

The following describes the structure of the receiving device 3. The receiving device 3 has a receiver 12, a check-receiving data reader 13, a receiving side checking data generator 14, a checking data reader 15, and a verifying unit 16.

The receiver 12 receives the LTC signal transmitted from the transmitting device 2. The receiving side check-receiving data reader 13 reads out the attachment data Ia from the user's bit area 20 for the received LTC signals and then outputs the data Ia to the receiving side checking data generator 14.

The receiving side checking data generator 14 uses the read attachment data Ia to carry out an operation on the basis of a given checking equation, thereby generating a receiving side checking data Dr. The checking equation used in the receiving side checking data generator 14 is the same as used in the transmitting side checking data generator 9.

The checking data reader 15 reads out the transmitting side checking data Dt from the received LTC signal. The verifying unit 16 compares the transmitting side checking data Dt to the receiving side checking data Dr, thereby verifying whether or not an error is generated in the user's bit area 20 for the received LTC signal.

In the figure, reference number 17 represents an LTC signal output terminal for outputting the LTC signal received by the receiver 12 outwards from the receiving device 3; and 18 represents a verified result output terminal for outputting the verified result from the verifying unit 16 outwards from the receiving device 3.

In the present embodiment, the transmitting side checking data generator 9 constitutes an example of a transmitting side checking data generator. The LTC signal generator 10 constitutes an example of an attaching unit. The check-receiving data reader 13 and the receiving side checking data generator 14 constitute a receiving side checking data generator. The checking data reader 15 and the verifying unit 16 constitute a verifying unit. However, these constitutions are examples for carrying out the present invention. Thus, the present invention may have any structure that can exhibit functions described in the claims.

The following describes the attachment data Ia. The attachment data Ia are data effective for a time code signal transmitting form as described below.

By recent developments in picture techniques, the format conversion of picture signals can be attained. For example, a picture signal in a 24P format can be converted to a picture signal in a 60I format. In the case where format conversion is carried out, in general, the number of frames per second increases or decreases. That is, by format conversion processing, the number of picture data which constitute each frame (hereinafter referred to as frame picture data) in picture signals increases or decreases. Therefore, at least one frame picture data among the respective frame picture data which constitute the picture signal before the conversion is deleted or is recorded in an overlap state on the picture signal after the conversion.

In the case of carrying out format conversion in such a way, reverse conversion to the format before the conversion is carried out if necessary. The reason for this is as follows.

In picture processing devices which are generally used, such as a non-linear editor, image processing can be carried out only in a wide-use format (for example, a 60I format or a 30P format) in many cases. On the other hand, in the case of converting a picture signal in a wide-use format (for example, a 60I picture signal or a 30P picture signal) to a picture signal in a non-wide-use format, it is necessary to convert the picture signal reversely to the format before the conversion in order that the picture signal will be image-processed in the above-mentioned general picture processing devices.

In the case of subjecting a picture signal converted into such a format that the number of frames per second increases to image processing (non-linear edition) or in other cases, it is effective to convert the picture signal reversely to the picture signal in the format before the conversion. This is based on the following reason or some other reasons: returning to the picture format before the conversion makes it possible to decrease record capacity at the time of the edition.

In the following description, such reverse conversion is named secondary conversion, and is distinguished from primary conversion, which is carried out at the first stage. Picture data are composed of frame picture data arranged successively along time series. In the case of an interlace picture signal, the frame picture data thereof is composed of a pair of field picture data.

In order to return a picture signal after primary conversion (hereinafter referred to as a primary conversion picture signal) precisely to the original picture by secondary conversion, it is necessary to grasp precisely the arrangement order of picture data in the primary conversion picture signal. The following describes the reason for this. Herein, the reason is described, giving, as an example, a conversion form at the time of converting 24P picture signals primarily to 60I picture signals or a conversion form at the time of converting 10P picture signals primarily to 60I picture signals. Needless to say, however, the reason is also true for other format conversions.

Figure 3:
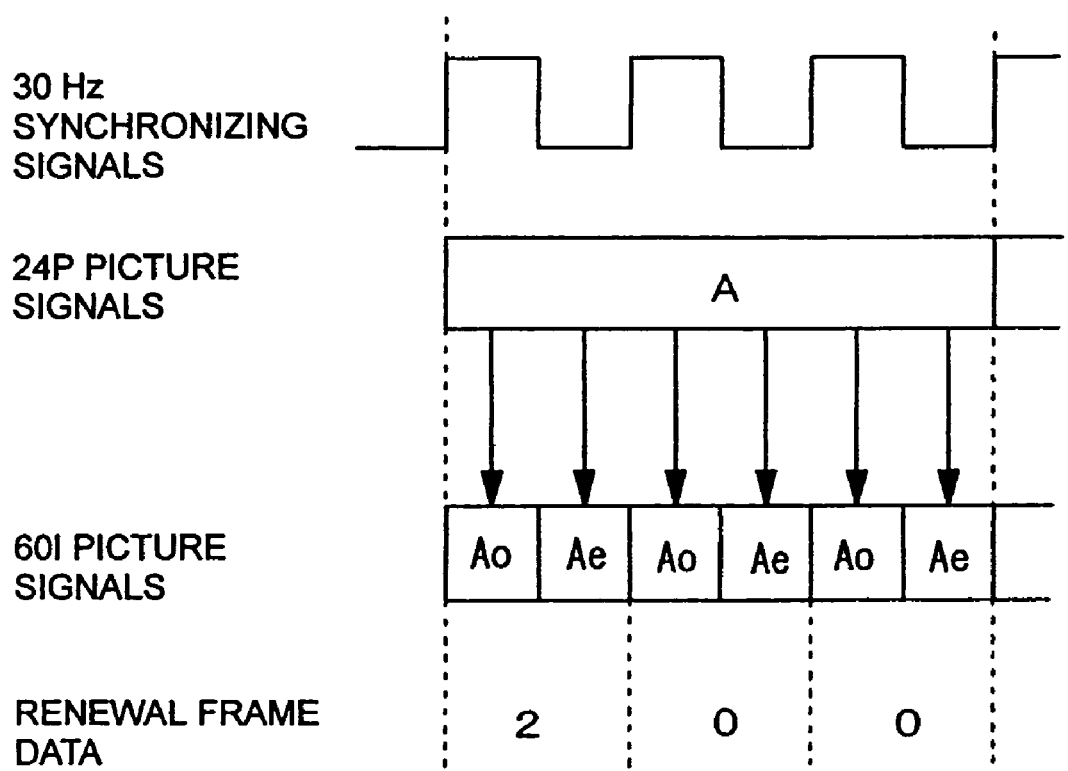
FIG. 3 is a schematic view illustrating a format conversion when 10P picture signals are format-converted to 60I picture signals.

FIGS. 2A and 2B illustrate conversion formats at the time of converting 24P picture signals primarily to 60I picture signals. FIG. 3 illustrates a conversion form for converting 10P picture signals primarily to 60I picture signals.

First, a case in which 24P picture signals are primarily converted to 60I picture signals is described, referring to FIG. 2A. FIG. 2A illustrates a conversion technique called the 2:3:2:3 pull-down technique. 24P frame picture data corresponding to four frames in 24P picture signals are primarily converted to 60I picture signals, whereby a data corresponding to one frame increases so that 60I frame picture data corresponding to five frames are generated.

In the case where the above-mentioned primary conversion (24P→60I) is carried out in the 2:3:2:3 pull-down conversion technique about the two picture signals having a format difference as described above, processing as described below is carried out.

First, from frame picture data (A), (B), (C) and (D), which are successively arranged on a time base in 24P picture signals, 24I frame picture data (Ao|Ae), (Bo|Be), (Co|Ce) and (Do|De) in 24I picture signals (interlace picture signals of 24 frames/second) are taken out, wherein "o" represents a first field, and "e" represents a second field.

Furthermore, from the taken-out 24I frame picture data (Ao|Ae), (Bo|Be), (Co|Ce) and (Do|De), 60I frame picture data (Ao|Ae), (Bo|Be), (Bo|Ce), (Co|De), and (Do|De) corresponding to five frames of 60I picture signals are generated. By repeating such a generation (conversion) operation for every four frames in the 24P format, the 24P picture signals are primarily converted to 60I picture signals.

At this time, among the respective 24I field picture data (Ao), (Ae), (Bo), (Be), (Co), (Ce), (Do) and (De) which constitute the taken-out 24I frame picture data (Ao|Ae), (Bo|Be), (Co|Ce) and (Do|De), two 24I field picture data (Bo) and (De), which total to one frame, are used in duplication. The 24I field picture data (Bo) and (De) used in duplication and positions where they are inserted are decided in advance. Furthermore, arrangement positions of the respective 24I field picture data (Ao), (Ae), (Bo), (Be), (Co), (Ce), (Do) and (De) including the 24I field picture data (Bo) and (De) used in duplication are also decided in advance. FIG. 2A illustrates the order of the inserting arrangement thereof. Hereinafter, such an arrangement-order-rearranging rule in primary conversion is referred to as the primary conversion rule.

The above-mentioned description with reference to FIG. 2A is about a conversion technique called the 2:3:2:3 pull-down conversion technique. In the case where 24P picture signals are primarily converted to 60I picture signals, there is also a conversion technique called the 2:3:3:2 pull-down conversion technique as shown in FIG. 2B. In the 2:3:3:2 pull-down conversion technique, two 24I field picture data (Bo) and (Ce) are used in duplication. The 24I field picture data (Bo) and (Ce) used in duplication and positions where they are inserted are decided in advance. Furthermore, arrangement positions of the respective 24I field picture data (Ao), (Ae), (Bo), (Be), (Co), (Ce), (Do) and (De) including the 24I field picture data (Bo) and (Ce) used in duplication are also decided in advance. FIG. 2B illustrates the order of the inserting arrangement thereof. The 2:3:3:2 pull-down conversion technique has only a minor difference from the 2:3:2:3 pull-down conversion technique in field combination at the time of conversion.

The following describes a case in which 10P picture signals are primarily converted to 60I picture signals. 10I frame picture data corresponding to one frame in 10I picture signals are primarily converted to 60I picture signals, whereby data corresponding to two frame increase so that 60I frame picture data corresponding to three frames are generated.

Specifically, from respective 10P frame picture data (A) in 10P picture signals, frame picture data (Ao|Ae) in 10I picture signals (interlace picture signals of 10 frames/second) are first taken out.

Furthermore, from the taken-out 10I picture data (Ao|Ae), 60I frame picture data (Ao|Ae), (Ao|Ae) and (Ao|Ae) corresponding to three frames of 60I picture signals are generated. Specifically, by duplicating the same 10I frame picture data (Ao|Ae) repeatedly by three frames, 60I frame picture data (Ao|Ae), (Ao|Ae) and (Ao|Ae) corresponding to three frames are generated. By repeating such a generation (conversion) operation for every frame in the 10P format, the 10P picture signals are primarily converted to 60I picture signals. FIG. 3 illustrates the order of the inserting arrangement thereof.

In order to convert each kind of the primary conversion picture signals described above secondarily to the original picture signal with high precision, it is necessary to cause each of the frames in the primary conversion picture signals to correspond to each of frames in picture signals after the secondary conversion with high precision. In order to cause such correspondence, it is important to obtain, with precision, frame positions where a change in picture data is generated in the primary conversion picture signals at the time of the secondary conversion.

In the time code signal transmitting device 1 of the present embodiment for transmitting time code signals corresponding to primary conversion picture signals (hereinafter referred to as primary conversion time code signals), the following attachment data Ia are attached to the user's bit area 20 for the transmitted time code signals. The user's bit area 20 is also called a binary group, and is set into 32 bits out of 64 bits of data bits of SMPTE/EBU time code signals.

A renewal frame data Ib is generated correspondingly to an interlace format, for example, in the following manner.

In the time code signal transmitting device 1, a data showing a frame position where a change in picture data is generated in primary conversion is used as the renewal frame data Ib, and the renewal frame data Ib selected in this way is attached to the user's bit area 20 for the primary conversion time code signal. The renewal frame data is an example of data showing the frame position of a picture signal wherein a change in picture data is generated by format conversion.

The renewal frame data Ib is generated correspondingly to an interlace format, for example, in the following manner. In the case where a change is generated in the picture data in the first field in the frame, a renewal frame data Ib(2) is attached to the user's bit area 20 for the primary conversion time code signal corresponding to the frame. In the case where a change is generated in the picture data in the second field in the frame, a renewal frame data Ib(1) is attached to the user's bit area 20 for the primary conversion time code signal corresponding to the frame. In the case where a change is not generated in any picture data in the frame, a renewal frame data Ib(0) is attached to the user's bit area 20 for the primary conversion time code signal corresponding to the frame.

When there is used the primary conversion time code signal to which the renewal frame data Ib corresponding to the state of the primary conversion of each frame is attached, primary conversion picture signals can be secondarily converted with high precision.

First, the function of the renewal frame data Ib and secondary conversion operation using the data are described giving, as an example, a case of returning picture signals obtained by converting 24P picture signals primarily to 60I picture signals to 24P picture signals by secondary conversion. Herein, the secondary conversion operation is described giving the 2:3:2:3 pull-down conversion technique as an example.

As shown in FIG. 2A, in this case, a change in picture data is generated, in the 60I picture signals after the primary conversion, as follows. In the frame (Ao|Ae), the picture data in the first field thereof is changed to the frame (not illustrated) immediately before the frame (Ao|Ae). In the frame (Bo|Be), the picture data in the first field thereof is changed to the frame (Ao|Ae), which is immediately before the frame (Bo|Be). In the frame (Bo|Ce), the picture data in the second field thereof is changed to the frame (Bo|Be), which is immediately before the frame (Bo|Ce). In the frame (Co|De), the picture data in the second field thereof is changed to the frame (Bo|Ce), which is immediately before the frame (Co|De). In the frame (Do|De), no picture data is changed to the frame (Co|De), which is immediately before the frame (Do|De).

On the basis of such changes in the picture data, in this time code signal transmitting device 1, the following renewal frame data Ib are attached to time code signals (LTC signals) corresponding to the primary conversion picture signals (60I picture signals). A renewal frame data Ib(2) is attached to the user's bit area 20 for the time code signal corresponding to each of the frames (Ao|Ae) and (Bo|Be). A renewal frame data Ib(1) is attached to the user's bit area 20 for the time code signals corresponding to the frames (Bo|Ce) and (Co|De). A renewal frame data Ib(0) is attached to the user's bit area 20 for the time code signal corresponding to the frames (Do|De).

The (numerical information) attached to each of the renewal frame data Ib means the following. (2) means that: in the present frame a change in the picture data in the first field thereof is generated; therefore, in second conversion the picture signals in the first and second fields which constitute the frame are used to generate a frame picture data.

(1) means that: in the present frame a change in the picture data in the second field thereof is generated; therefore, in second conversion the field picture data in the second field which constitutes the frame and the field picture data in the first field in the next frame are used to generate a frame picture data.

(0) means that: in the present frame the picture data is not changed from the previous frame; therefore, in second conversion it is unnecessary to generate any frame picture data from the field picture data which constitutes this frame.

The above has described the second conversion operation, giving the 2:3:2:3 pull-down conversion technique as an example. However, needless to say, in the 2:3:3:2 pull-down conversion technique illustrated in FIG. 2B, the same secondary conversion operation is carried out.

In the case where the renewal frame data Ib attached to time code signals are used to convert primary conversion picture signals (60I picture signals) secondarily to 24P picture signals, the following processing is carried out to the primary conversion picture signals (60I picture signals).

In the frame (Ao|Ae), a frame picture data (A) of a 24P picture signal is generated from the field picture data (Ao) in the first field where the picture data is changed and the second field picture data (Ae), which is next to the (Ao) on time. The generation of the frame picture data (A) is based on the reading of the renewal frame data Ib(2) attached to the user's bit area 20 for the time code signal corresponding to the frame.

In the frame (Bo|Be), a frame picture data (B) of a 24P picture signal is generated from the field picture data (Bo) in the first field where the picture data is changed and the second field picture data (Be), which is next to the (Bo) on time. The generation of the frame picture data (B) is based on the reading of the renewal frame data Ib(2).

In the frame (Bo|Ce), a frame picture data (C) of a 24P picture signal is generated from the field picture data (Ce) in the second field where the picture data is changed and the first field picture data (Co) in the frame (Co|De), which is next to the (Ce) on time. The generation of the frame picture data (C) is based on the reading of the renewal frame data Ib(1).

In the frame (Co|De), a frame picture data (D) of a 24P picture signal is generated from the field picture data (De) in the second field where the picture data is-changed and the first field picture data (Do) in the frame (Do|De), which is next to the, (De) on time. The generation of the frame picture data (D) is based on the reading of the renewal frame data Ib(1).

In the frame (Do|De), no frame picture data of a 24P picture signal is generated from the picture data in this frame. The generation of no frame picture signal is based on the reading of the renewal frame data Ib(0).

By carrying out such secondary conversion, the primary conversion picture signals (60I picture signals) can be secondarily converted to 24P picture signals with high precision.

The following describes the content of the renewal frame data Ib and secondary conversion operation, giving, as an example, a case of returning picture signals obtained by converting 10P picture signals primarily to 60I picture signals to 10P picture signals by secondary conversion.

As shown in FIG. 3, in this case, a change in picture data is generated, in the primary conversion picture signals (60I picture signals), as follows. In the first frame (Ao|Ae), the picture data in the first field thereof is changed to the frame (not illustrated) immediately before the frame (Ao|Ae). In each of the second and third frames (Ao|Ae) and (Ao|Ae), no picture data are changed to the frame immediately before the frame.

On the basis of such changes in the picture data, in this time code signal transmitting device 1, the next renewal frame data Ib is attached to the user's bit area 20 for time code signals corresponding to the primary conversion picture signals (60I picture signals). A renewal frame data Ib(2) is attached to the user's bit area 20 for the time code signal corresponding to the first frame (Ao|Ae). A renewal frame data Ib(0) is attached to the user's bit area 20 for each of the time code signals corresponding to the second and third frames (Ao|Ae) and (Ao|Ae).

In the case where the renewal frame data Ib attached to the time code signals are used to convert the primary conversion picture signals (60I picture signals) secondarily to 10P picture signals, the following processing is carried out to the primary conversion picture signals (60I picture signals).

In the first frame (Ao|Ae), a 10P frame picture data (A) is generated from the field picture data (Ao) in the first field where the picture data is changed and the second field picture data (Ae), which is next to the (Ao) on time, on the basis of the reading of the renewal frame data Ib(2) attached to the user's bit area 20 for the time code signal corresponding to the frame. In the second and third frames (Ao|Ae) and (Ao|Ae), no frame picture data are generated from the picture data in these frames on the basis of the reading of the renewal frame data Ib(0).

By carrying out such secondary conversion, the primary conversion picture signals (60I picture signals) can be secondarily converted to 10P picture signals with high precision.

In order to use the renewal frame data Ib to carry out the above-mentioned secondary conversion, it is necessary to generate conversion periodic signals for the primary conversion picture signals. The conversion periodic signals are signals showing, when original picture signals are converted to primary conversion picture signals, the variable period of the picture data. In the case where 24P picture signals are primarily converted to 60I picture signals, the conversion periodic signals have a five-frame period. In the case where 10P picture signals are primarily converted to 60I picture signals, the change periodic signals have a three-frame period. On the side of a device for carrying out secondary conversion (image processing device), conversion periodic signals can be made on the basis of the renewal frame data Ib attached to time code signals. The reason why conversion periodic signals can be made on the basis of the renewal frame data Ib is as follows. About the renewal frame data Ib, the data are repeated in accordance with the conversion period at the time of primary conversion. Therefore, by detecting the repetition period, conversion periodic signals can be made.

In the time code signal transmitting device 1 of the present embodiment, another attachment data Ia is further attached to the user's bit area 20 for time code signals. In the case where 24P picture signals are primarily converted to 60I picture signals or 30P picture signals or in other cases, a periodic sequence in which five frames of the primary conversion picture signals (60I picture signals or 30P picture signals) are set to one period is repeatedly carried out. As described above, such a periodic sequence is called the 2:3:2:3 pull-down processing or 2:3:3:2 pull-down processing (see FIGS. 2A and 2B about details of these pull-down processings).

In the primary conversion picture signals subjected to these pull-down processings, the same primary conversion processing is repeatedly carried out for every five frames. Therefore, the primary conversion picture signals can be secondarily converted with precise when it is possible to grasp which of period positions in the five-frame period each of the frames in the primary conversion picture signals (60I picture signals or 30P picture signals) is present in. Thus, in the time code signal transmitting device 1 of the present embodiment, five sequence number data Id(00), (01), (02), (03) and (04) are successively attached to time code signals corresponding to the primary conversion picture signals (60I picture signals or 30P picture signals), so as to correspond to the respective frame positions.

Specifically, sequence number data Id of (00 01 02 03 04 00 01 02 03 04 . . . ) are produced to correspond to values (00 01 02 03 04 05 06 07 08 09 10 11 . . . 27 28 29 00 . . . ) of the frame places of time codes in the primary conversion picture signals (60I picture signals or 30P picture signals). The produced sequence number data Id are attached to the user's bit area 20 for time code signals in the state that the data Id are caused to correspond to positions of the respective frames of the time code signals.

The sequence number data Id is calculated as the remainder obtained by dividing any time code by an integer of 5. This is a calculating method based on the matter that each of the above-mentioned pull-down processings is a processing in which format conversion processing is repeated for every five frames.

In the primary conversion picture signals (60I picture signals), the sequence number data Id have the following primary meaning. In each of the frames, in the primary conversion picture signals (60I picture signals) corresponding to the sequence number data Id(00) and Id(01), a picture data change is generated in the field picture data in the first field thereof. In each of the frames, in the primary conversion picture signals (60I picture signals) corresponding to the sequence number data Id(02) and Id(03), a picture data change is generated in the field picture data in the second thereof. In each of the frames, in the primary conversion picture signals (60I picture signals) corresponding to the sequence number data Id(04), a picture data change is not generated in the field picture data in any field thereof. The sequence number data Id is an example of data showing a synchronized state between the frame conversion period and time code advance at the time of format conversion.

In the case of using the time code signals to which the sequence number data Id having such a meaning are attached to convert the primary conversion picture signals (60I picture signals) secondarily to 24P picture signals, the following processing is carried out to the primary conversion picture signals (60I picture signals).

In the frame (Ao|Ae), the following processing is carried out on the basis of the reading of the sequence number data Id(00) attached to the user's bit area 20 for the time code signal corresponding to the position of the frame. In this case, a frame picture data (A) is generated from the field picture data (Ao) in the first field in the frame where a picture data change is generated, and the second field picture data (Ae), which is next thereto in time.

In the frame (Bo|Be), the following processing is carried out on the basis of the reading of the sequence number data Id(01) attached to the user's bit area 20 for the time code signal corresponding to the position of the frame. In this case, a frame picture data (B) is generated from the field picture data (Bo) in the first field in the frame where a picture data change is generated, and the second field picture data (Be), which is next thereto in time.

In the frame (Bo|Ce), the following processing is carried out on the basis of the reading of the sequence number data Id(02) attached to the user's bit area 20 for the time code signal corresponding to the position of the frame. In this case, a frame picture data (C) is generated from the field picture data (Ce) in the second field in the frame where a picture data change is generated, and the first picture data (Co) in the frame (Co|De), which is next thereto in time.

In the frame (Co|De), the following processing is carried out on the basis of the reading of the sequence number data Id(03) attached to the user's bit area 20 for the time code signal corresponding to the position of the frame. In this case, a frame picture data (D) is generated from the field picture data (De) in the second field in the frame where a picture data change is generated, and the first field picture data (Do) in the frame (Do|De), which is next thereto in time.

In the frame (Do|De), on the basis of the reading of the sequence number data Id(04) attached to the user's bit area 20 for the time code signal corresponding to the position of the frame, no frame picture data is generated from the picture data in this frame (Do|De).

By carrying out such secondary conversion, the 60I picture signals after being subjected to the primary conversion can be secondarily converted to 24P picture signals with high precision.

In the case where 24P picture signals are primarily converted to 30P picture signals and then the 30P picture signals are reversely converted to 24P picture signals by secondary conversion, each of the above-mentioned pull-down processings is basically performed, as described above. Therefore, the above-mentioned sequence number data Id are effective. Thus, by applying secondary conversion to the primary conversion picture signals (30P picture signals) on the basis of the sequence number data Id, the 30P picture signals can be precisely returned to 24P picture signals.

As described above, the sequence number data Id are auxiliary data which are effective when picture signals to which each of the above-mentioned pull-down processings is applied at the time of primary conversion (24p picture signals→60I picture signals or 24P picture signals→30P picture signals) are secondarily converted (60I picture signals→24P picture signals, or 30P picture signals 24P picture signals). Consequently, the data Id are not effective when other picture signals to which each of the above-mentioned pull-down processings is not applied at the time of primary conversion (10P picture signals→60I picture signals) are secondarily converted. For this reason, no sequence number data Id are given to time code signals which are attached to other primary conversion picture signals to which each of the above-mentioned pull-down processings is not applied at the time of primary conversion. In this case, the data of NO INFO (for example, Fh in the 16 number system representation) is attached to the user's bit area 20.

Figure 4:
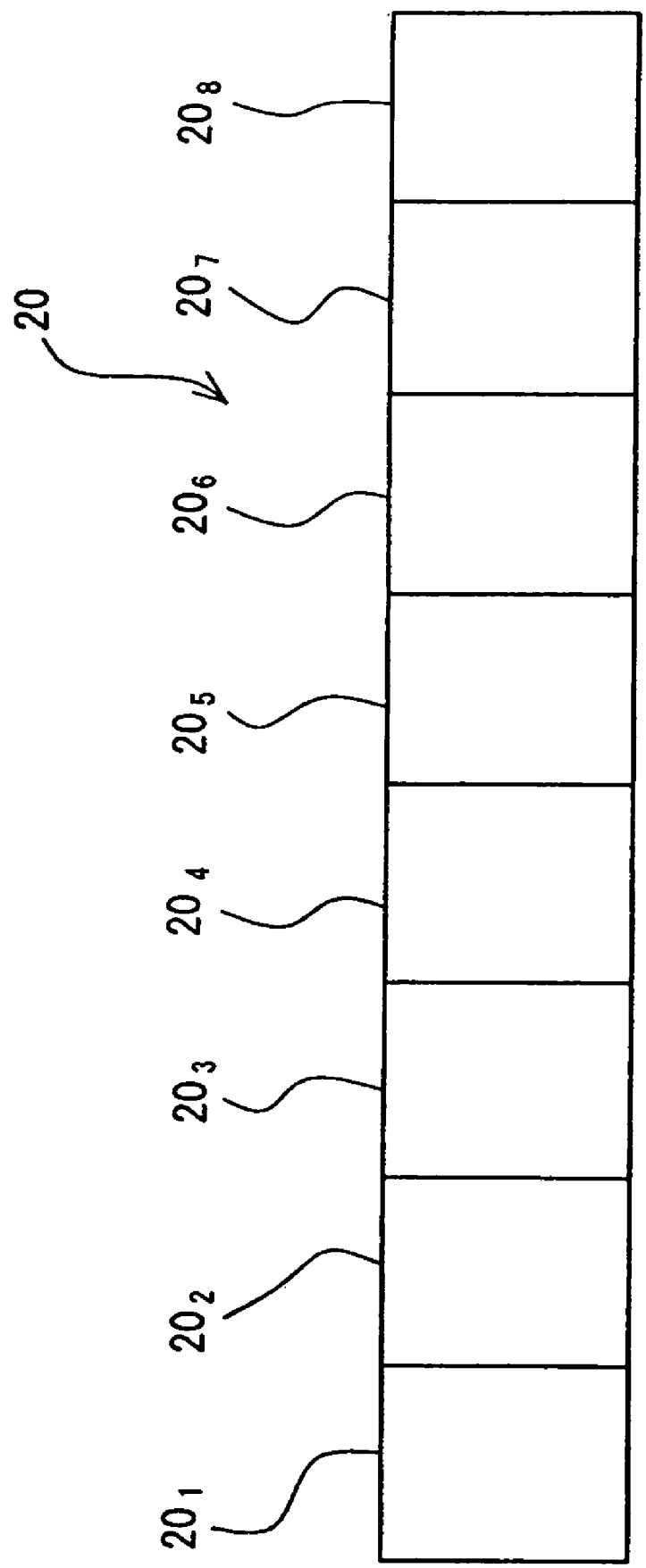
FIG. 4 is a schematic view illustrating the configuration of a user's bit area for time code signals (LTC signals) used in the present invention.

The renewal frame data Ib or the sequence number data Id described above are recorded on the user's bit area 20 for time code signals transmitted by the time code signal transmitting device 1. The following describes an example of the configuration of data stored in the user's bit area 20 for the transmitted time code signals with reference to FIG. 4.

The user's bit area 20 has first to eighth recording areas $20_1$ to $20_8$. In the first recording area $20_1$ and the second recording area $20_2$, a transmitting side checking data Dt is stored. The third memory area $20_3$ is a reserve area, and is not particularly used as a data-storing area in the present invention. In the fourth recording area $20_4$, a sequence number data Id is stored. In the fifth memory area $20_5$ and the sixth recording area $20_6$, a frame rate data $Ic_1$ is stored. In the seventh memory area $20_7$, a data $Ic_2$ for distinguishing interlace/progressive formats from each other and a data $Ic_3$ for distinguishing the 2:3:2:3 technique/the 2:3:3:2 technique from each other in pull-down processing are stored. In the eighth memory area $20_8$, a renewal frame data Ib and some other auxiliary data $Ic_3$ are stored.

The following describes an example of the method of calculating the above-mentioned transmitting side checking data Dt and receiving side checking data Dr.

The data in the first to eighth recording areas $20_1$ to $20_8$ which constitute the user's bit area 20 for transmitted time code signals are represented by a1 to a8, in sequence. Each of the transmitting side checking data Dt and the receiving side checking data Dr is calculated in the 16 number system from the following equation (1):

$$Dt, Dr = ((00h + A34 + A56 + A78) \& FFh) XOR\ 55h \quad (1)$$

$$A34 = (a3 << 4) + a4$$

$$A56 = (a5 << 4) + a6$$

$$A78 = (a7 << 4) + a8$$

wherein XOR: an operator for performing exclusive logical OR operation,

<<: an operator for performing bit shift to a high-order digit,

&: an operator for performing logical AND operation, and h means a numerical value in the 16 number system.

The recording areas $20_1$ and $20_2$ are areas in which the transmitting side checking data Dt is stored, it is impossible to use such the receiving side checking data Dt as a variable to calculate the transmitting side checking data Dt or the receiving side checking data Dr. For this reason, in the equation (1), variables corresponding to the first and second recording areas $20_1$ and $20_2$ are set to 00h.

When the above-mentioned equation (1) is used, the transmitting side checking data Dt and the receiving side checking data Dr are calculated, for example, as follows: when a1=*, a2=*, a3=C, a4=D, a5=1, a6=2, a7=3 and a8=4, they are:

$$Dt, Dr = ((00h + CDh + 12h + 34h)\ \&\ FFh) XOR\ 55h$$

$$= (113h\ \&\ FFh) XOR\ 55h$$

$$= 46h$$

The following describes a method of using the time code signal transmitting device 1 of the present embodiment to transmit time code signals. Herein, the method is described on the assumption that time code signals corresponding to picture signals which are format-converted from 24P picture signals to 60I picture signals by primary conversion processing are transmitted.

First, an operation performed by the receiving device 2 is described. First, a time code data It generated outside the time code signal transmitting device 1 is read out in the time code data reader 4. The time code data It read out herein is a time code data It corresponding to a picture signal format-converted to a 60I picture signal by primary conversion. The time code data reader 4 outputs the read time code data It to the renewal frame data generator 5, the time code auxiliary data generator 6 and the sequence number data generator 7.

The renewal frame data generator 5 generates the above-mentioned renewal frame data Ib from the inputted time code data It to output the data to the LTC signal generator 10 and the transmitting side checking data generator 9.

The time code auxiliary generator 6 generates time code auxiliary data Ic (a frame rate data $Ic_1$, an interlace/progressive format distinguishing data $Ic_2$, and other auxiliary data $Ic_3$) from the inputted time code data It to output the data to the LTC signal generator 10 and the transmitting side checking data generator 9.

The sequence number data generator 7 generates the above-mentioned sequence number data Id from the inputted time code data It to output the data to the LTC signal generator 10 and the transmitting side checking data generator 9.

The transmitting side checking data generator 9 uses the inputted renewal frame data Ib, time code auxiliary data Ic and sequence number data Id as checking data to subject these checking data to checking-processing based on a given checking equation (an example thereof being described above), so as to generate a transmitting side checking data Dt. The transmitting side checking data generator 9 outputs the generated transmitting side checking data Dt to the LTC signal generator 10.

The LTC signal generator 10 generates an LTC signal, which is a time code signal, on the basis of the inputted time code data It, attachment data Ia (renewal frame data Ib, time code auxiliary data Ic, and sequence number data Id) and transmitting side checking data Dt. Herein, the attachment data Ia and the transmitting side checking data Dt are stored in the user's bit area 20 for the LTC signal. The manner of the storage has been described above with reference to FIG. 4, and description thereof is omitted here.

The LTC signal generated in the LTC signal generator 10 is transmitted from the transmitter 11 to the receiving device 3.

The following describes an operation performed by the receiving device 3. First, the LTC signal received by the receiver 12 passes, as it is, through the receiver 12 so as to be outputted from the LTC signal output terminal 17 to the outside. At this time, the LTC signal is supplied to the check-receiving data reader 13 and the checking data reader 15.

The check-receiving data reader 13 reads out a check-receiving data from the LTC signal inputted from the receiver 12. The check-receiving data is read out, about each frame of LTC signals, from the user's bit area 20 thereof. Specifically, the attachment data Ia, which is stored in the user's bit area 20 for each of the frames of LTC signals, is read out as the check-receiving data.

The check-receiving data (attachment data Ia) read out in the check-receiving data reader 13 is supplied to the receiving side checking data generator 14. In the receiving side checking data generator 14, the same checking equation as set in the transmitting side checking generator 9 is set and memorized beforehand. The receiving side checking data generator 14 applies an operation based on the memorized checking equation to the supplied data for receiving check (attachment data Ia). An example of the checking equation is the above-mentioned equation (1).

The receiving side checking data generator 14 outputs the operation result, as a receiving side checking data Dr, to the verifying unit 16.

On the other hand, the checking data reader 15 reads out the transmitting side checking data Dt from the user's bit area 20 for the LTC signal received in the receiver 12. The receiving side checking data Dt is read out in frames of LTC signals. The checking data reader 15 supplies the read transmitting side checking data Dt to the verifying unit 16.

The verifying unit 16 compares the receiving side checking data Dr supplied from the receiving side checking generator 14 to the transmitting side checking data Dt supplied from the checking data reader 15 in frame. When the two data are consistent with each other, the verifying unit 16 determines that, in the received LTC signal, no error is present in the data in the user's bit area 20 in the position of the frame. On the other hand, when the two data are not consistent with each other, the verifying unit 16 determines that, in the received LTC signal, some errors are present in the data in the user's bit area 20 in the position of the frame. The verifying unit 16 outputs the error-detected result from the verified result output terminal 18 to the outside of the receiving device 3.

The time code signal transmitting device of the present embodiment detects whether or not an error is generated in the user's bit area 20 for the LTC signal which is being transmitted by the error-detecting operation described above.

Since the time code signal transmitting device 1 compares the transmitting side checking data Dt to the receiving side checking data Dr for each of the frames, an error in the user's bit area 20 for LTC signals can be specified and detected in frame. In the case of performing format conversion, it is particularly effective that an error can be detected in frame. When primary conversion in which the number of frames per second increases or decreases is performed, frame data which is effective in secondary conversion are scattered in frame data which constitute the primary conversion picture signals. Therefore, the time code signal transmitting device 1 which can detect an error in frame is particularly effective for carrying out highly precise second conversion.

In the above-mentioned embodiment, the sequence number data Id and the renewal frame data Ib are attached to the user's bit area 20, thereby raising conversion precision at the time of secondary conversion. However, the same advantageous effect can be obtained by attaching only the renewal frame data Ib to the user's bit area 20. In the same manner, the same advantageous effect can be obtained by attaching only the sequence number data Id to the user's bit area 20.

Furthermore, the area to which the sequence number data Id or the renewal frame data Ib is attached is not limited to the user's bit area 20. Needless to say, the area may be any signal area if, in time code signals (LTC signals), these data can be attached thereto.

INDUSTRIALLY APPLICABILITY

According to the present invention, an error generated during transmission of time code signals can be effectively detected.

The invention claimed is:

1. A time code signal transmitting method, comprising:
the step of reading a check-receiving data included in a transmitted time code signal and using the read check-receiving data to generate a transmitting side checking data, the step of attaching the transmitting side checking data to the transmitted time code signal, the step of reading the check-receiving data from the received time code signal and using the read check-receiving data to generate a receiving side checking data, as a post-processing step after the time code signal is received, and the step of reading the transmitting side checking data from the received time code signal and comparing the read transmitting side checking data to the receiving side checking data, thereby verifying whether or not an error is generated in the received time code signal as a pre-processing step at the time of transmitting the time code signal.

2. The time code transmitting method according to claim 1, wherein the transmitted time code signal is a single time code signal.

3. The time code signal transmitting method according to claim 2, wherein the transmitted single time code signal is an LTC (linear time code) signal.

4. The time code signal transmitting method according to claim 1, wherein there is used a data recorded on a user's bit area for the time code signal as the check-receiving data to attach the checking data to the user's bit area for the time code signal.

5. The time code signal transmitting method according to claim 1, wherein the time code signal is a time code signal corresponding to a picture signal to which format conversion in which a change in the number of frames per second is generated is applied.

6. The time code signal transmitting method according to claim 5, wherein the time code signal is a signal to which a data on the format conversion is attached.

7. A time code signal transmitting device, comprising a transmitting device for transmitting a time code signal, and a receiving device for receiving the time code signal transmitted by the transmitting device, wherein the transmitting device comprises:

a transmitting side checking data generator for reading a check-receiving data included in the transmitted time code signal and using the read check-receiving data to generate a transmitting side checking data, and an attaching unit for attaching the transmitting side checking data to the transmitted time code signal, and the receiving device comprises:

a receiving side checking data generator for reading the check-receiving data from the received time code signal and using the read check-receiving data to generate a receiving side checking data, and a verifying unit for reading the transmitting side checking data from the received time code signal and comparing the read transmitting side checking data to the receiving side checking data, thereby verifying whether or not an error is generated in the received time code signal.

8. The time code transmitting device according to claim 7, wherein the transmitted time code signal is a single time code signal.

9. The time code signal transmitting device according to claim 8, wherein the transmitted single time code signal is an LTC (linear time code) signal.

10. The time code signal transmitting device according to claim 7, wherein the transmitting side checking data generator is a unit for reading the check-receiving data from a use's bit area for the time code signal, and the attaching unit is a unit for attaching the transmitting side checking data to the user's area for the time code signal.

11. The time code signal transmitting device according to claim 7, wherein the time code signal is a time code signal corresponding to a picture signal to which format conversion in which a change in the number of frames per second is generated is applied.

12. The time code signal transmitting device according to claim 11, wherein the time code signal is a signal to which a data on the format conversion is attached.

* * * * *